(12) United States Patent
Choi et al.

(10) Patent No.: US 12,405,452 B2
(45) Date of Patent: Sep. 2, 2025

(54) CAMERA MODULE INCLUDING FOLDED OPTICS

(71) Applicant: SAMSUNG ELECTRONICS CO., LTD., Suwon-si (KR)

(72) Inventors: Dongok Choi, Suwon-si (KR); Min Heu, Suwon-si (KR); Jaehyoung Park, Suwon-si (KR); Jaeheung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 452 days.

(21) Appl. No.: 17/889,921

(22) Filed: Aug. 17, 2022

(65) Prior Publication Data

US 2023/0053416 A1 Feb. 23, 2023

Related U.S. Application Data

(63) Continuation of application No. PCT/KR2022/012004, filed on Aug. 11, 2022.

(30) Foreign Application Priority Data

Aug. 17, 2021 (KR) .................. 10-2021-0108053

(51) Int. Cl.
*G02B 13/00* (2006.01)
*G02B 9/04* (2006.01)
(Continued)

(52) U.S. Cl.
CPC .......... *G02B 13/0065* (2013.01); *G02B 9/04* (2013.01); *G02B 27/0018* (2013.01); *G02B 5/208* (2013.01)

(58) Field of Classification Search
CPC .. G02B 13/0065; G02B 9/04; G02B 27/0018; G02B 5/208; G02B 5/003; G03B 11/045;
(Continued)

(56) References Cited

U.S. PATENT DOCUMENTS 9,316,810 B2 * 4/2016 Mercado .............. G02B 13/002
2003/0011892 A1 * 1/2003 Hall ....................... G02B 23/12
359/726
(Continued)

FOREIGN PATENT DOCUMENTS

CN 102419470 A 4/2012
CN 104570279 A 4/2015
(Continued)

OTHER PUBLICATIONS

"Understanding Focal Length and Field of View", Hollows et al., Edmund Optics 2016 (Year: 2016).*
(Continued)

*Primary Examiner* — Wyatt A Stoffa
*Assistant Examiner* — John Curtis Sipes
(74) *Attorney, Agent, or Firm* — Sughrue Mion, PLLC

(57) ABSTRACT

A camera module includes: a first refractive member configured to reflect or refract light that is incident on the first refractive member in a first direction, in a second direction intersecting the first direction; a second refractive member configured to reflect or refract the light that is reflected or refracted by the first refractive member and is incident on the second refractive member in the second direction, in a third direction intersecting the second direction; an image sensor configured to detect the light that is reflected or refracted by the second refractive member and is incident on the image sensor in the third direction; and at least one optical member provided between the first refractive member and the second refractive member, wherein the at least one optical member is configured to block the light that is reflected or refracted by the first refractive member from being incident on the image sensor, and to guide the light that is reflected or refracted by the first refractive member to be incident on the second refractive member in the second direction.

16 Claims, 9 Drawing Sheets

(51) Int. Cl.
*G02B 27/00* (2006.01)
*G02B 5/20* (2006.01)

(58) Field of Classification Search
CPC ........ G03B 17/17; G03B 30/00; G03B 17/12; H04N 23/54; H04N 23/57
See application file for complete search history.

(56) References Cited

U.S. PATENT DOCUMENTS

| | | |
|---|---|---|
| 2009/0153726 A1 | 6/2009 | Lim |
| 2012/0075728 A1 | 3/2012 | Takakubo et al. |
| 2015/0070568 A1 | 3/2015 | Kim et al. |
| 2015/0103417 A1 | 4/2015 | Nomura et al. |
| 2015/0109684 A1 | 4/2015 | Son |
| 2015/0253543 A1* | 9/2015 | Mercado ................ H04N 23/00 348/370 |
| 2015/0253647 A1 | 9/2015 | Mercado |
| 2015/0288865 A1 | 10/2015 | Osborne |
| 2016/0269602 A1* | 9/2016 | Osborne ................ G03B 13/36 |
| 2017/0108669 A1 | 4/2017 | Kim |
| 2019/0196148 A1* | 6/2019 | Yao .................... G02B 13/0035 |
| 2020/0183058 A1 | 6/2020 | Shinohara |
| 2020/0371374 A1 | 11/2020 | Barak et al. |
| 2021/0048628 A1* | 2/2021 | Shabtay ................ G02B 13/02 |
| 2021/0063704 A1 | 3/2021 | Son et al. |
| 2021/0080807 A1 | 3/2021 | Sharma |
| 2021/0149157 A1 | 5/2021 | Kim et al. |

FOREIGN PATENT DOCUMENTS

| | | |
|---|---|---|
| CN | 106597650 A | 4/2017 |
| JP | 2007-6038 A | 1/2007 |
| JP | 2007-133096 A | 5/2007 |
| JP | 2014-21231 A | 2/2014 |
| KR | 1020090062472 A | 6/2009 |
| KR | 1020150029330 A | 3/2015 |
| KR | 1020160140905 A | 12/2016 |
| KR | 1020170043943 A | 4/2017 |
| KR | 1020200030129 A | 3/2020 |
| KR | 1020210001993 A | 1/2021 |
| KR | 1020210027187 A | 3/2021 |
| KR | 1020210033914 A | 3/2021 |

OTHER PUBLICATIONS

Communication issued Feb. 27, 2024 by the European Patent Office in European Patent Application No. 22854145.4.

International Search Report (PCT/ISA/210) and Written Opinion (PCT/ISA/237) dated Nov. 28, 2022 issued by the International Searching Authority in International Application No. PCT/KR2022/012004.

Communication issued on Jun. 20, 2025 by the China National Intellectual Property Administration in Chinese Patent Application No. 202280005955.9.

* cited by examiner

CAMERA MODULE INCLUDING FOLDED OPTICS

CROSS-REFERENCE TO RELATED APPLICATIONS

This application is a continuation application, claiming priority under § 365(c), of an International application No. PCT/KR2022/012004, filed on Aug. 11, 2022, which is based on and claims priority to Korean Patent Application No. 10-2021-0108053, filed on Aug. 17, 2021 in the Korean Intellectual Property Office, the disclosures of which are incorporated by reference herein in their entireties.

BACKGROUND

Technical Field

The disclosure relates to a lens assembly or a camera module, for example, to a camera module including a folded optics.

Background Art

An electronic device may be a device that performs a specific function according to a program provided therein (e.g., an electronic scheduler, a portable multimedia reproducer, a mobile communication terminal, a tablet personal computer (PC), an image/sound device, a desktop/laptop PC, or a vehicle navigation system), as well as a home appliance. The above-mentioned electronic devices may output, for example, information stored therein as sound or an image. As the degree of integration of electronic devices has increased and super-high-speed and large-capacity wireless communication has become popular, multiple functions have recently come to be provided in a single electronic device, such as a mobile communication terminal. For example, various functions, such as an entertainment function such as a game function, a multimedia function such as a music/video play function, a communication and security function for mobile banking or the like, and/or a schedule management or e-wallet function, are integrated in a single electronic device, in addition to a communication function.

With the development of digital camera manufacturing technology, electronic devices equipped with small and lightweight camera modules have been commercialized. As an electronic device (e.g., a mobile communication terminal) that is generally carried at all times is equipped with a camera module, it becomes possible for a user to easily utilize various functions such as video call or augmented reality as well as to take a picture or video.

In recent years, electronic devices including a plurality of cameras have been distributed. An electronic device may include, for example, a camera module including a wide-angle camera and a telephoto camera. The electronic device may acquire a wide-angle image by photographing a wide-range scene around the electronic device using the wide-angle camera, or may acquire a telephoto image by photographing a scene corresponding to a location relatively far from the electronic device using the telephoto camera. In this way, by including a plurality of camera modules or lens assemblies, miniaturized electronic devices such as smart phones are making inroads into the compact camera market, and are expected to replace high-performance cameras such as single-lens reflex cameras in the future.

SUMMARY

Technical Problem

In a miniaturized electronic device including a plurality of camera modules, a folded optics camera may be useful for extending or enlarging a focal length. For example, in a folded camera, since an optical member such as a prism is disposed, the direction in which lenses are arranged can be freely designed or arranged, regardless of the direction in which external light is incident, and thus it is easy to extend the focal length. As the degree of design freedom for the arrangement direction of lenses is improved in folded cameras, a miniaturized telephoto camera can be implemented, and can be mounted in an electronic device in combination with a wide-angle camera. In general, by including an optical image stabilizer in a camera, the quality of an acquired image can be improved, and the performance of a telephoto camera for photographing a distant subject can be greatly improved when the optical image stabilization function is combined therewith.

In a camera of a miniaturized and/or lightweight electronic device, by implementing the optical image stabilization function in a manner of shifting an image sensor, which is lighter and smaller in volume than optics, it is possible to secure good power efficiency while saving installation space. However, in a miniaturized electronic device, it may be difficult to secure an installation space for a camera in which a telephoto function and an optical image stabilization function are combined.

One or more embodiments of the disclosure provide at least solve the above-described problems and/or disadvantages and provide at least the advantages described below, and are able to provide a lens assembly and/or a camera module that facilitates implementation of a telephoto function in a miniaturized electronic device.

One or more embodiments of the disclosure provide a lens assembly and/or a camera module that facilitates implementation of an image stabilization function combined with a telephoto function in a miniaturized electronic device.

One or more embodiments of the disclosure provide a lens assembly and/or a camera module in which a high-performance image sensor is easily mounted while having a telephoto function and an image stabilization function in a miniaturized electronic device.

The problems to be solved in the disclosure are not limited to the above-mentioned problems, and may be variously expanded without departing from the spirit and scope of the disclosure.

The problems to be solved in the disclosure are not limited to the above-mentioned problems, and additional aspects according to various embodiments will be presented through the detailed description to be described later, and may be partially clear from the description or understood through the presented embodiments.

According to an aspect of the disclosure, there is provided a camera module including: a first refractive member configured to reflect or refract light that is incident on the first refractive member in a first direction, in a second direction intersecting the first direction; a second refractive member configured to reflect or refract the light that is reflected or refracted by the first refractive member and is incident on the second refractive member in the second direction, in a third direction intersecting the second direction; an image sensor configured to detect the light that is reflected or refracted by the second refractive member and is incident on the image sensor in the third direction; and at least one optical member provided between the first refractive member and the second refractive member, wherein the at least one optical member is configured to block the light that is reflected or refracted by the first refractive member from being incident on the image sensor, and to guide the light that is reflected or refracted by the first refractive member to be incident on the second refractive member in the second direction.

The at least one optical member may include: a dummy member extending in the second direction and configured to transmit light traveling in the second direction; and a light shielding member provided on at least a portion of an outer circumferential surface of the dummy member, wherein the light shielding member is configured to absorb, scatter or reflect the light that is reflected or refracted by the first refractive member to block the light from being incident on the image sensor.

The camera module may further include a lens group having a positive refractive power, wherein the lens group is configured to guide or focus, to the first refractive member, the light that is incident in the first direction.

The at least one optical member may include at least one lens configured to move forward and backward between the first refractive member and the second refractive member along the second direction.

The at least one optical member may further include a light shielding member provided on at least a portion of an outer circumferential surface of the at least one lens, and configured to absorb, scatter, or reflect the light that is reflected or refracted by the first refractive member to block the light from being incident on the image sensor.

The camera module may further include an infrared cut-off filter provided between the second refractive member and the image sensor, and the image sensor may be configured to detect light that passes through the infrared cut-off filter.

At least one of the first refractive member, the second refractive member, or the at least one optical member may include an infrared cut-off coating layer, and the image sensor may be configured to detect light that passes through the infrared cut-off coating layer.

The second direction may be perpendicular to the first direction, and the third direction may be perpendicular to the second direction.

The image sensor may be configured to horizontally move in a plane perpendicular to the first direction or a plane perpendicular to the third direction.

An effective focal length may be 1.8 times or more and 2.5 times or less of a diagonal length of an imaging plane of the image sensor.

The at least one optical member may include a light shielding member configured to at least partially absorb, scatter, or reflect the light that is reflected or refracted by the first refractive member and travels toward the image sensor.

The camera module may further include at least one lens configured to move forward and backward along the second direction between the first refractive member and the second refractive member, wherein the at least one lens is configured to guide or focus, to the second refractive member, the light that is reflected or refracted by the first refractive member.

The camera module may further include an infrared cut-off filter provided between the second refractive member and the image sensor, wherein the light shielding member is provided on at least a portion of the infrared cut-off filter, and the image sensor is configured to detect light that passes through the infrared cut-off filter.

The camera module may further include: a lens group having a positive refractive power and configured to guide or focus, to the first refractive member, the light incident on the first refractive member in the first direction; and at least one lens provided between the first refractive member and the second refractive member, the at least one lens being configured to move forward and backward along the second direction, wherein the at least one lens is configured to guide or focus, to the second refractive member, the light that is reflected or refracted by the first refractive member.

The camera module may further include a dummy member provided between the first refractive member and the second refractive member and configured to guide or focus, to the second refractive member, the light that is reflected or refracted by the first refractive member, wherein the light shielding member is provided on at least a portion of an outer circumferential surface of the dummy member.

According to various embodiments disclosed herein, since the lens assembly and/or the camera module include the folded optics, the telephoto function may be easily implemented in a miniaturized electronic device. For example, since the arrangement direction of the lenses or the forward/backward movement of the lenses for focus adjustment can be implemented substantially parallel to the longitudinal direction or the width direction of the electronic device, a telephoto function can be easily implemented without substantially affecting the thickness of the electronic device. In another embodiment, in the lens assembly and/or camera module, incident light can be refracted at least once (e.g., twice) to reach the image sensor, and the optical image stabilization function can be implemented in the manner of shifting the image sensor in the longitudinal or width direction of the electronic device. For example, it may be easy to secure an installation space of the image sensor and a shift interval for the optical image stabilization function. In another embodiment, as it becomes easy to secure the installation space, it is easy to increase the size and to improve performance of the image sensor, and the performance of the camera can be improved in terms of image quality. In addition, various effects directly or indirectly understood through this document can be provided.

Other aspect(s), advantage(s) and principal configuration(s) of the disclosure will become apparent to those skilled in the art upon reading the following detailed description of various embodiments with reference to the accompanying drawings.

BRIEF DESCRIPTION OF DRAWINGS

The above and other aspects, features, and advantages of certain embodiments of the present disclosure will be more apparent from the following description taken in conjunction with the accompanying drawings, in which.

Throughout the appended drawings, like reference numerals may be assigned to like parts, components, and/or structures.

DETAILED DESCRIPTION

The following description made with reference to the appended drawings may be provided in order to help comprehensive understanding of the various implementations of the disclosure defined by the claims and their equivalents. A specific embodiment disclosed in the following description includes various specific details to help understanding, but is considered to be one of various embodiments. Accordingly, it will be apparent to those skilled in the art that various changes and modifications of the various implementations described herein can be made without departing from the scope and spirit of the disclosure. In addition, descriptions of well-known functions and configurations may be omitted for clarity and brevity.

The terms and words used in the following description and claims are not limited to a bibliographical meaning, but may be used to clearly and consistently describe the various embodiments disclosed herein. Therefore, it will be obvious to those skilled in the art that the following description of various implementations of the disclosure is provided only for the purpose of explanation, not for the purpose of limiting the disclosure defined as the scope of rights and equivalents thereto.

It should be understood that the singular forms of "a", "an", and "the" include plural meanings, unless the context clearly indicate otherwise. Thus, for example, "a component surface" may mean including one or more of component surfaces.

Figure 1:
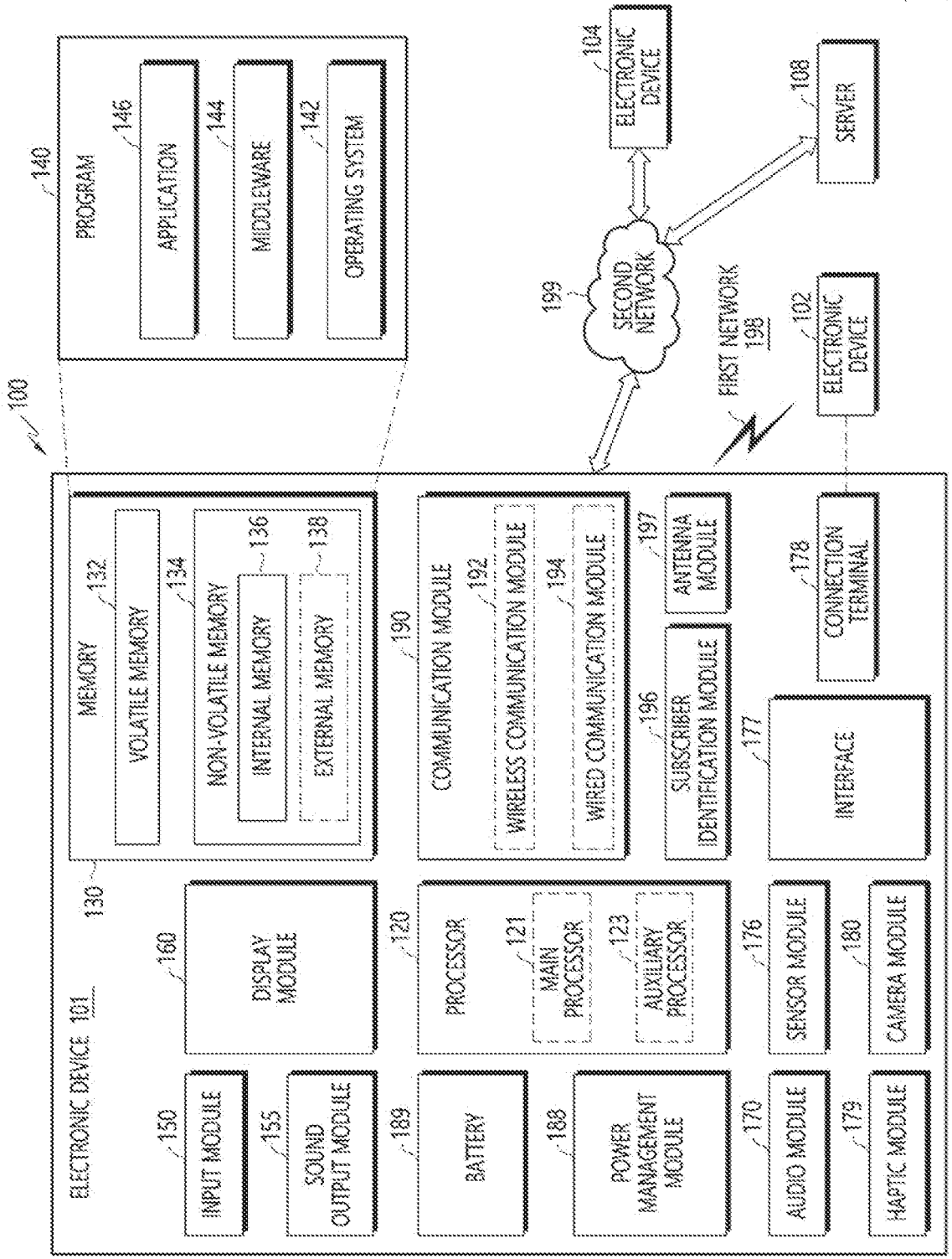
FIG. 1 is a block diagram illustrating an electronic device according to various embodiments within a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and configured to support a designated high-frequency band (e.g., the mmWave band), and a plurality of antennas (e.g., array antennas) disposed on a second surface (e.g., the top or a side surface) of the printed circuit board, or adjacent to the second surface and configured to transmit or receive signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed description, a longitudinal direction, a width direction, and/or a thickness direction of an electronic device may be referred to, wherein the longitudinal direction may be defined as the "Y-axis direction", the width direction may be defined as the "X-axis direction", and/or the thickness direction may be defined as the "Z-axis direction". In some embodiments, "negative/positive (−/+)" may be referred to together with the Cartesian coordinate system illustrated in the drawings regarding the direction in which a component is oriented. For example, the front surface of an electronic device or a housing may be defined as a "surface oriented in the +Z direction", and the rear surface may be defined as a "surface oriented in the −Z direction". In some embodiments, a side surface of an electronic device or a housing may include an area oriented in the +X direction, an area oriented in the +Y direction, an area oriented in the −X direction, and/or an area oriented in the −Y direction. In another embodiment, the "X-axis direction" may include both the "−X direction" and the "+X direction". It is noted that these are based on the Cartesian coordinate system described in the drawings for the sake of brevity of description, and the description of these directions or components does not limit the various embodiments disclosed herein.

Figure 2:
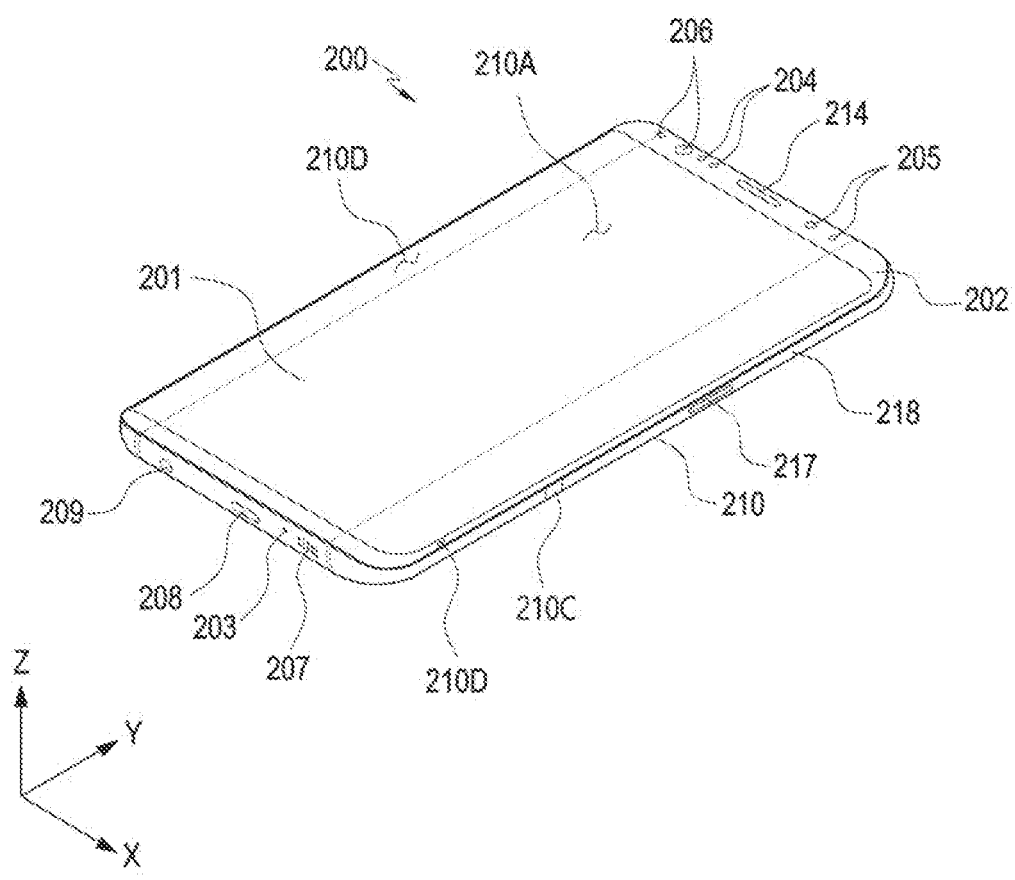
FIG. 2 is a perspective view illustrating the front surface of the electronic device according to various embodiments.
Figure 3:
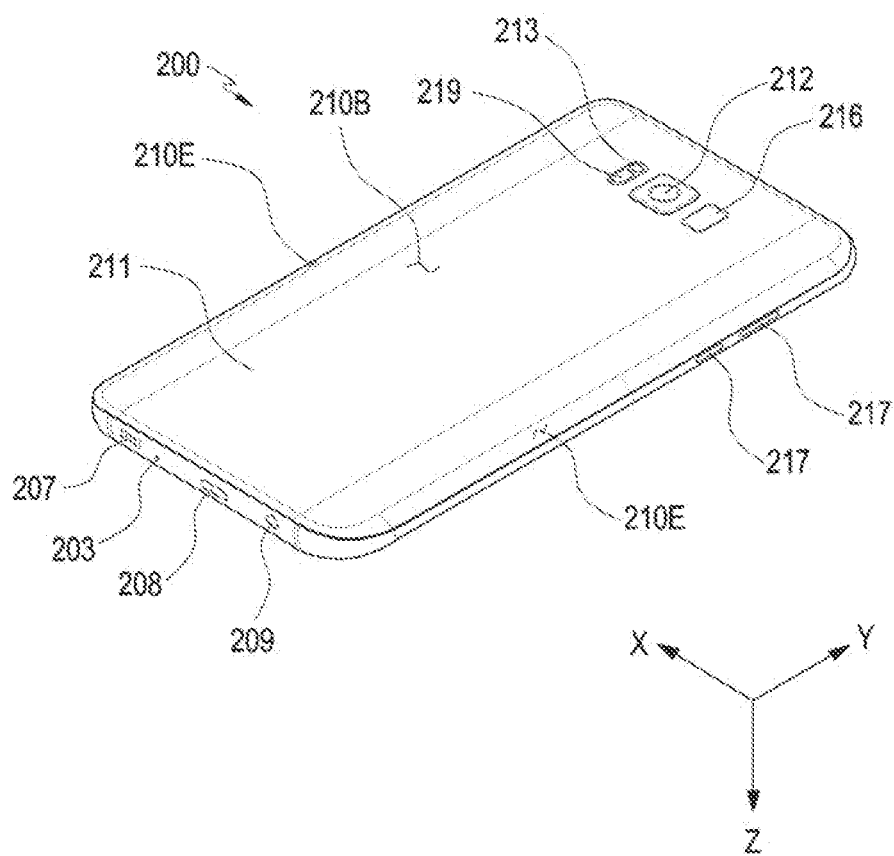
FIG. 3 is a perspective view illustrating the rear surface of the electronic device illustrated in FIG. 2.

FIG. 2 is a perspective view illustrating the front surface of the electronic device 200 according to various embodiments. FIG. 3 is a perspective view illustrating the rear surface of the electronic device 200 illustrated in FIG. 2.

Referring to FIGS. 2 and 3, an electronic device 200 according to an embodiment may include a housing 210 including a first surface (or a front surface) 210A, a second surface (or a rear surface) 210B, and a side surface 210C surrounding the space between the first surface 210A and the second surface 210B. In another embodiment, the term "housing" may refer to a structure forming some of the first surface 210A, the second surface 210B, and the side surface 210C of FIG. 2. According to an embodiment, at least a portion of the first surface 210A may be defined by a substantially transparent front plate 202 (e.g., a glass plate or a polymer plate including various coating layers). The second surface 210B may be defined by a substantially opaque rear plate 211. The rear plate 211 may be made of, for example, coated or colored glass, ceramic, a polymer, a metal (e.g., aluminum, stainless steel (STS), or magnesium), or a combination of two or more of these materials. The side surface 210C may be a side structure (or a "side bezel structure") 218 coupled to the front plate 202 and the rear plate 211 and including a metal and/or a polymer. In some embodiments, the rear plate 211 and the side structure 218 may be integrated with each other, and may include the same material (e.g., a metal material such as aluminum).

In the illustrated embodiment, the front plate 202 may include two first areas 210D, which are bent from the first surface 210A toward the rear plate 211 and extend seamlessly, at the opposite long edges thereof. In FIG. 3, the rear plate 211 may include, at the opposite long edges thereof, two second areas 210E, which are bent from the second surface 210B toward the front plate 202 and extend seamlessly. In some embodiments, the front plate 202 (or the rear plate 211) may include only one of the first areas 210D (or the second areas 210E). In another embodiment, some of the first areas 210D or the second areas 210E may not be included. In the above-described embodiments, when viewed from a side of the electronic device 200, the side structure 218 may have a first thickness (or width) on the side faces, which do not include the first areas 210D or the second areas 210E, and may have a second thickness, which is smaller than the first thickness, on the side faces, which include the first areas 210D or the second areas 210E.

According to an embodiment, the electronic device 200 may include at least one of a display 201, audio modules 203, 207, and 214, sensor modules 204, 216, and 219, camera modules 205, 212, and 213, key input devices 217, light-emitting elements 206, and connector holes 208 and 209. In some embodiments, at least one of the components (e.g., the key input devices 217 or the light-emitting elements 206) may be omitted from the electronic device 200, or other components may be additionally included in the electronic device 200.

The display 201 may be exposed through, for example, a considerable portion of the front plate 202. In some embodiments, at least a portion of the display 201 may be exposed through the front plate 202 defining the first surface 210A and the first areas 210D of the side surfaces 210C. In some embodiments, the edges of the display 201 may be configured to be substantially the same as the shape of the periphery of the front plate 202 adjacent thereto. In another embodiment, the distance between the periphery of the display 201 and the periphery of the front plate 202 may be substantially constant in order to enlarge the exposed area of the display 201.

In another embodiment, recesses or openings may be configured in a portion of the screen display area of the display 201, and one or more of the audio module 214, the sensor modules 204, the camera modules 205, and the light-emitting elements 206, which are aligned with the recesses or the openings, may be included. In another embodiment, the rear surface of the screen display area of the display 201 may include at least one of the audio modules 214, the sensor modules 204, the camera modules 205, the fingerprint sensor 216, and the light-emitting elements 206. In another embodiment, the display 201 may be coupled to or disposed adjacent to a touch-sensitive circuit, a pressure sensor configured to measure a touch intensity (pressure), and/or a digitizer configured to detect a magnetic-field-type stylus pen. In some embodiments, at least some of the sensor modules 204 and 219 and/or at least some of the key input devices 217 may be disposed in the first areas 210D and/or the second areas 210E.

The audio modules 203, 207, and 214 may include a microphone hole 203 and speaker holes 207 and 214. The microphone hole 203 may include a microphone disposed therein to acquire external sound, and in some embodiments, a plurality of microphones may be disposed therein to be able to detect the direction of sound. The speaker holes 207 and 214 may include an external speaker hole 207 and a phone call receiver hole 214. In some embodiments, the speaker holes 207 and 214 and the microphone hole 203 may be implemented as a single hole, or a speaker (e.g., a piezo speaker) may be included without the speaker holes 207 and 214.

The sensor modules 204, 216, and 219 may generate electrical signals or data values corresponding to the internal operating state or the external environmental state of the electronic device 200. The sensor modules 204, 216, and 219 may include, for example, a first sensor module 204 (e.g., a proximity sensor) and/or a second sensor module (e.g., a fingerprint sensor) disposed on the first surface 210A of the housing 210, and/or a third sensor module 219 (e.g., an HRM sensor) and/or a fourth sensor module 216 (e.g., a fingerprint sensor) disposed on the second surface 210B of the housing 210. The fingerprint sensor may be disposed not only on the first surface 210A (e.g., the display 201) of the housing 210, but also on the second surface 210B. The electronic device 200 may further include the sensor module 176 of FIG. 1, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212, and 213 may include a first camera device 205 disposed on the first surface 210A of the electronic device 200, a second camera device 212 disposed on the second surface 210B thereof, and/or a flash 213. The camera devices 205 and 212 may include one or more lenses, an image sensor, and/or an image signal processor. The flash 213 may include, for example, a light-emitting diode or a xenon lamp. In some embodiments, two or more lenses (e.g., an infrared camera lens, a wide-angle lens, and a telephoto lens) and image sensors may be disposed on one surface of the electronic device 200.

The key input devices 217 may be disposed on the side surface 210C of the housing 210. In another embodiment, the electronic device 200 may not include some or all of the above-mentioned key input devices 217, and a key input device 217, which is not included in the electronic device 300, may be implemented in another form, such as a soft key, on the display 201. In some embodiments, the key input devices may include a sensor module 216 disposed on the second surface 210B of the housing 210.

The light-emitting elements 206 may be disposed, for example, on the first surface 210A of the housing 210. The light-emitting elements 206 may provide, for example, information about the state of the electronic device 200 in an optical form. In another embodiment, the light-emitting elements 206 may provide a light source that is interlocked with, for example, the operation of the camera module 205. The light-emitting elements 206 may include, for example, an LED, an IR LED, and a xenon lamp.

The connector holes 208 and 209 may include a first connector hole 208, which is configured to accommodate a connector (e.g., a USB connector) for transmitting/receiving power and/or data to/from an external electronic device, and/or a second connector hole 209, which is configured to accommodate a connector (e.g., an earphone jack) for transmitting/receiving an audio signal to/from an external electronic device.

Figure 4:
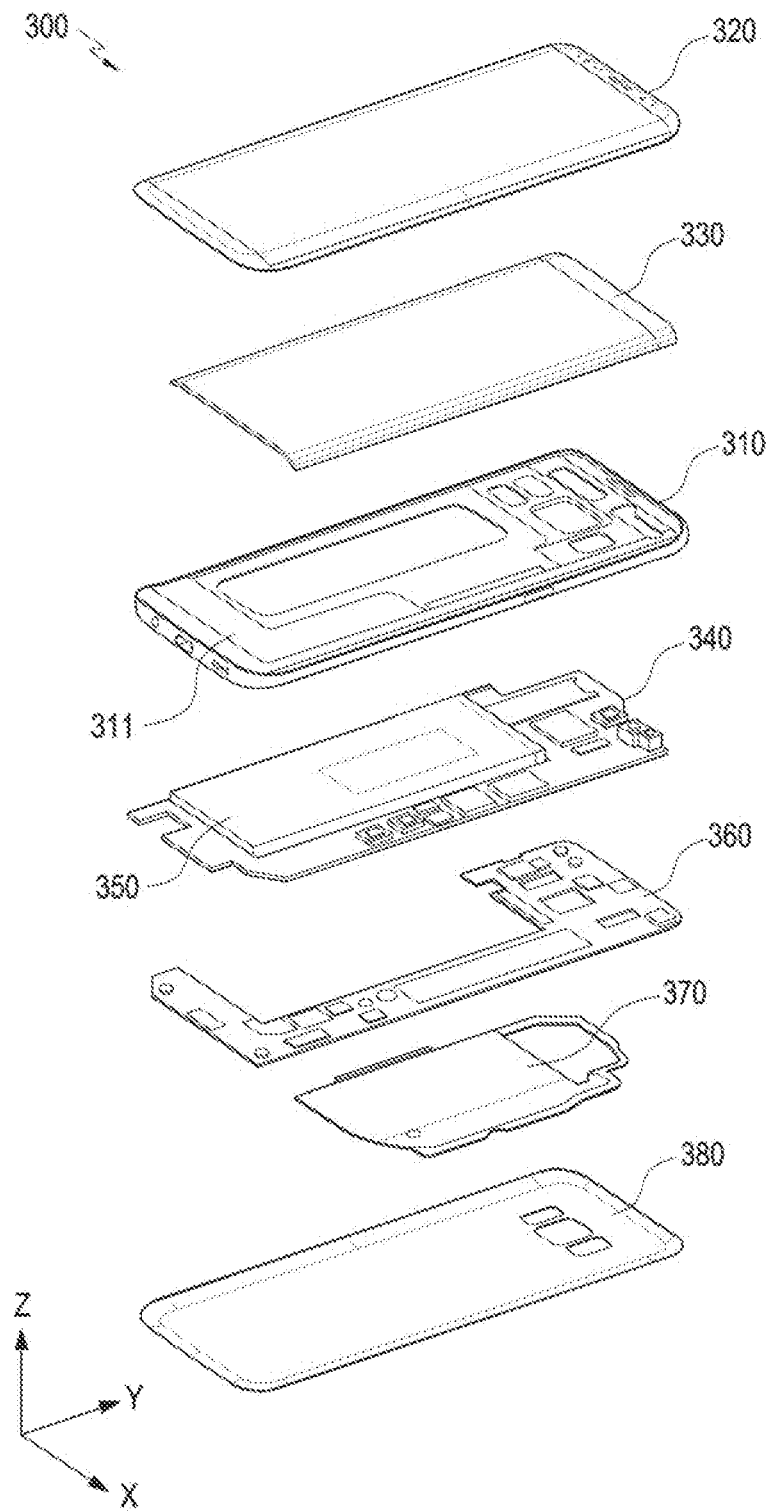
FIG. 4 is an exploded perspective view illustrating the electronic device illustrated in FIG. 2.

FIG. 4 is an exploded perspective view illustrating the electronic device 300 illustrated in FIG. 2.

Referring to FIG. 4, the electronic device 300 may include a side structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, in the electronic device 300, at least one of the components (e.g., the support member 311 or the second support member 360) may be omitted, or other components may be additionally included. At least one of the components of the electronic device 300 may be the same as or similar to at least one of the components of the electronic device 200 of FIG. 2 or FIG. 3, and a redundant description thereof will be omitted below.

The first support member 311 may be disposed inside the electronic device 300, and may be connected to the side structure 310 or may be integrated with the side structure 310. The first support member 311 may be made of, for example, a metal material and/or a non-metal material (e.g., a polymer). The display 330 may be coupled to one surface of the first support member 311, and the printed circuit board 340 may be coupled to the other surface of the first support member 411. On the printed circuit board 340, a processor, a memory, and/or an interface may be mounted. The processor may include one or more of, for example, a central processing unit, an application processor, a graphics processor, an image signal processor, a sensor hub processor, or a communication processor.

The memory may include, for example, a volatile memory or a nonvolatile memory.

The interface may include, for example, a high-definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/an MMC connector, or an audio connector.

The battery 350 is a device configured to supply power to at least one component of the electronic device 300, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 300, or may be detachably disposed on the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 is configured to, for example, perform short-range communication with an external device or transmitting/receiving power required for charging to/from an external device in a wireless manner. In another embodiment, an antenna structure may be provided by the side structure 310, a portion of the first support member 311, or a combination thereof.

In the following detailed description, reference may be made to the electronic devices 101, 102, 104, 200, and 300 of the embodiments, and the same reference numerals in the drawings are given for components that can be easily understood through the embodiments or omitted, and a detailed description thereof may also be omitted.

Figure 5:
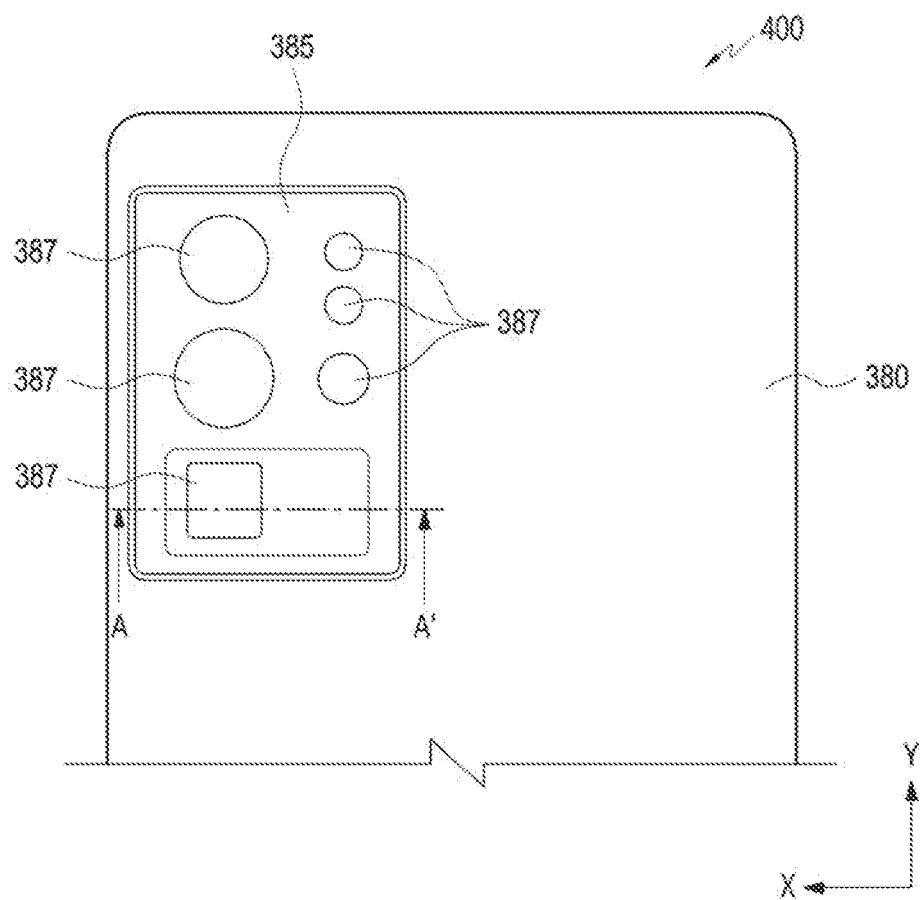
FIG. 5 is a plan view illustrating the rear surface of the electronic device according to various embodiments.
Figure 6:
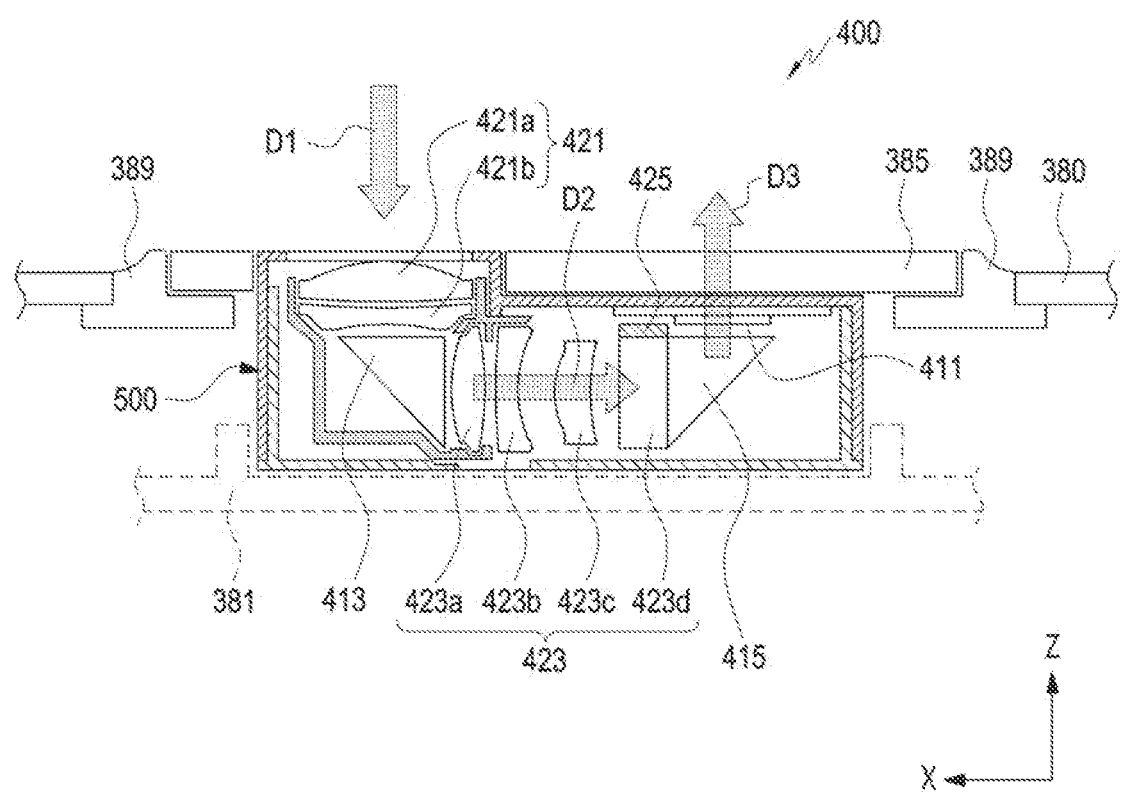
FIG. 6 is a cross-sectional view obtained by cutting a portion of the electronic device along line A-A in FIG. 5.
Figure 7:
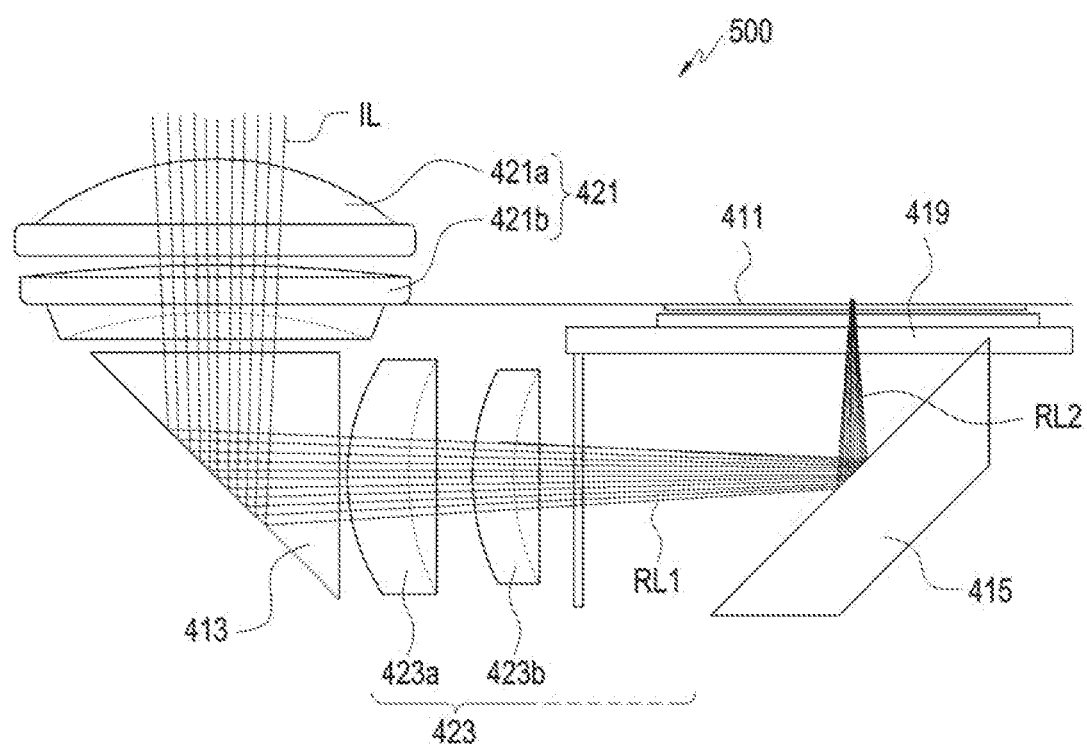
FIG. 7 is a configuration view illustrating an optical path of a camera module in the electronic device according to various embodiments.

FIG. 5 is a plan view illustrating the rear surface of an electronic device 400 (e.g., the electronic device 101, 102, 104, 200, or 300 in FIGS. 1 to 4) according to various embodiments. FIG. 6 is a cross-sectional view obtained by cutting a portion of the electronic device 400 along line A-A' in FIG. 5. FIG. 7 is a configuration view illustrating an optical path of a camera module 500 in the electronic device 400 according to various embodiments.

Referring to FIGS. 5 and 6, the electronic device 400 according to various embodiments may include a camera window 385 disposed on one surface (e.g., the second surface 210B in FIG. 3). In some embodiments, the camera window 385 may be a portion of the rear plate 380. In an embodiment, the camera window 385 may be coupled to the rear plate 380 via a decorative member 389. When viewed from the outside, the decorative member 389 may be exposed in the form of wrapping the periphery of the camera window 385. According to an embodiment, the camera window 385 may include a plurality of transparent areas 387, and the electronic device 400 may receive external light or transmit light to the outside through at least one of the transparent areas 387. For example, the electronic device 400 may include at least one camera module 500 (e.g., the camera module 180, 205, 212, or 213 in FIGS. 1 to 3) disposed to correspond to at least some of the transparent areas 387 and at least one light source (e.g., an infrared light source) disposed to correspond to other ones of the transparent areas 387. In some embodiments, the camera module 500 or the light source may receive external light or emit light to the outside of the electronic device 400 through any one of the transparent areas 387. In an embodiment, the electronic device 400 or the camera module 500 may further include a camera support member 381. The camera support member 381 may allow at least one of the camera module 500 or other camera modules (e.g., a wide-angle camera, an ultra-wide-angle camera, or a macro camera) adjacent to the same to be disposed or fixed inside the rear plate 380 or the camera window 385. In some embodiments, the camera support member 381 may be substantially a portion of the first support member 311 or the second support member 360 of FIG. 4.

According to various embodiments, the electronic device 400 may include at least one of a camera module 500 or a wide-angle camera, an ultra-wide-angle camera, a macro camera, a telephoto camera, or an infrared photodiode as a light-receiving element, and may include a flash (e.g., the flash 213 in FIG. 3) or an infrared laser diode as a light source or a light-emitting element. In some embodiments, the electronic device 400 may emit an infrared laser toward a subject using an infrared laser diode and an infrared photodiode and receive the infrared laser reflected by a subject to detect a distance or depth to the subject. In another embodiment, the electronic device 400 may photograph a subject by using any one camera or using two or more of the cameras in combination, and may provide illumination toward the subject using a flash, if necessary.

According to various embodiments, among the cameras, a wide-angle camera, an ultra-wide-angle camera, or a close-up camera may have a smaller length in the optical axis (O) direction of the lens(s) when compared to a telephoto camera (e.g., the camera module 500). For example, in a telephoto camera (e.g., the camera module 500) having a relatively large focal length, the total track length of the lens or lenses 423*a*, 423*b*, and 423*c* may be larger than those of other cameras. The total track length may be a distance from the object-side surface of the first object-side lens to the imaging surface of the image sensor. In an embodiment, the wide-angle camera, the ultra-wide-angle camera, or the close-up camera may have substantially little effect on the thickness of the electronic device 400 even if the lens or lenses may be arranged along the thickness of the electronic device 400 (e.g., the thickness measured in the Z-axis direction of FIG. 4 or FIG. 6). For example, a wide-angle camera, an ultra-wide-angle camera, or a close-up camera may be disposed in the electronic device 400 in the state in which a direction in which light is incident from the outside to the electronic device 400 is substantially the same as an optical axis direction of the lens or lenses. In another embodiment, when compared to a wide-angle camera, an ultra-wide-angle camera, or a close-up camera, the camera module 500 (e.g., a telephoto camera) has a smaller angle of view, but may be useful for photographing a subject from a greater distance, and may include more lenses 421*a*, 421*b*, 423*a*, 423*b*, and 423*c*. For example, when the lens or lenses 423*a*, 423*b*, and 423*c* of the camera module 500 may be arranged in the thickness direction of the electronic device 400 (e.g., the Z-axis direction), the thickness of the electronic device 400 may increase or, the camera module 500 may substantially protrude to the outside of the electronic device 400. In various embodiments, the camera module 500 may include at least one refractive member 413 or 415 that reflects or refracts incident light IL in different directions. In implementing a telephoto function, the lenses 423*a*, 423*b*, and 423*c* may be arranged to move forward or backward in the incident direction of light or the traveling direction of reflected or refracted light, thereby preventing or reducing the increase of the thickness of the electronic device 400.

Referring to FIGS. 6 and 7, the folded camera (e.g., the camera module 500) may include a first refractive member 413, a second refractive member 415, an image sensor 411, and/or at least one optical lens (e.g., the second lens group 423 including the second lenses 423*a*, 423*b*, and 423*c* or the dummy member 423*d*). In an embodiment, the at least one optical member may guide or focus, to the second refractive member 415, light RL1 reflected or refracted by the first refractive member 413, and may block the light RL1 reflected or refracted the first refractive member 413 from being directly incident on the image sensor 411. In general, the term "optical member" may be a component configured to transmit, refract, scatter, absorb, or reflect light. In describing various embodiments disclosed herein, the term optical member may refer to the second lenses 423a, 423b, and 423c or the dummy member 423d disposed between the first refractive member 413 and the second refractive member 415. However, it is noted that this term or expression does not limit the various embodiments. For example, the first refractive member 413, the second refractive member 415, and/or the first lenses 421a and 421b (or the first lens group 421) may be types of the optical member. In the following detailed description, if necessary, the optical member disposed between the first refractive member 413 and the second refractive member 415 may be separately described as the second lens or lenses and/or the dummy member, and the second lenses 423a, 423b, 423c or the dummy member 423d may be described as a second lens group 423 in combination.

According to various embodiments, the first refractive member 413 may include, for example, a prism or a mirror, and may reflect or refract light IL that is incident in the first direction D1, in the second direction D2 intersecting the first direction D1. The first direction D1 may be, for example, the direction in which light IL is incident on the electronic device 400 or the camera module 500 from the outside through at least one of the transparent areas 387 of FIG. 5 when photographing a subject. In some embodiments, the first direction D1 may be a photographing direction, a subject direction, an orientation direction of the camera module 500, or a direction parallel thereto. In another embodiment, the first direction D1 may be parallel to the thickness direction of the electronic device 400 or the Z-axis direction. According to an embodiment, when the second direction D2 is perpendicular to the first direction D1, it may be more easy to design the camera module 500 or an optical path. For example, the second direction D2 may be parallel to the longitudinal direction of the electronic device 400 (e.g., the Y-axis direction) or the width direction of the electronic device 400 (e.g., the X-axis direction). However, embodiments are not limited thereto. For example, the second direction D2 may be designed in an inclined direction rather that a direction perpendicular to the first direction D1 depending on the arrangement and specifications of the camera module 500 or the first refractive member 413 in the electronic device 400, and may be a direction inclined with respect to the X-axis or the Y-axis while being parallel to the X-Y plane.

According to various embodiments, the second refractive member 415 may include, for example, a prism or a mirror, and may reflect or refract light RL1 that is reflected or refracted by the first refractive member 413 and is incident in the second direction D2, in the third direction D3 intersecting the second direction D2. In an embodiment, the third direction D3 may be substantially perpendicular to the second direction D2. For example, the third direction D3 may be a direction parallel to the Z-axis direction. However, embodiments are not limited thereto, and the third direction D3 may be a direction inclined with respect to the second direction D2 or the X-Y plane depending on the arrangement and specifications of the camera module 500 or the second refractive member 415 in the electronic device 400. In another embodiment, the third direction D3 may be parallel to the first direction D1.

According to various embodiments, the image sensor 411 may be configured to detect the light RL2 that is reflected or refracted by the second refractive member 415 and is incident along the third direction D3. For example, the light IL incident from the outside may be detected by the image sensor 411 via the first refractive member 413 and the second refractive member 415, and the electronic device 400 or the camera module 500 may acquire a subject image based on a signal or information detected through the image sensor 411. In an embodiment, the image sensor 411 may be disposed substantially parallel to the X-Y plane. For example, when the camera module 500 has an optical image stabilization function of a structure that shifts the image sensor 411, the image sensor 411 may move horizontally in a plane perpendicular to the first direction D1 or the third direction D3.

According to various embodiments, in performing the optical image stabilization function, the image sensor 411 may be shifted in the longitudinal direction of the electronic device 400 (e.g., Y-axis direction) or the width direction of the electronic device 400 (e.g., X-axis direction). For example, since the image sensor 411 is disposed on a plane perpendicular to the first direction D1 or the third direction D3, it may be easier to increase the size of the image sensor in an electronic device having a small thickness (e.g., a thickness within about 10 mm) and/or to secure a space for the optical image stabilization operation. In an embodiment, when the camera module 500 is used as a telephoto camera, the quality of a captured image may be further enhanced by being provided with the optical image stabilization function. In another embodiment, when the image sensor 411 is enlarged, the performance of the camera module 500 may be further enhanced.

According to various embodiments, the camera module 500 may further include a lens group (e.g., the first lens group 421 including one or more first lenses 421a and 421b) that guides or focuses, to the first refractive member 413, the light IL that is incident in the first direction D1, wherein the at least one optical member may be disposed between the first refractive member 413 and the second refractive member 415 to provide a second lens group 423. In an embodiment, the first lens group 421 or the first lens (e.g., the first lens 421a) disposed on the object side in the camera module 500 may have a positive refractive power. For example, by configuring the first lens 421a to focus or align the light IL that is incident from the outside, to the first refractive member 413, the optics from the first lens 421a to the image sensor 411 may be miniaturized. According to an embodiment, the first lens group 421 may further include an additional first lens or lenses 421b in order to focus or align light incident from the outside.

According to various embodiments, at least one optical member (e.g., the second lens group 423) may include a dummy member 423d and a light shielding member 425. The dummy member 423d may have, for example, a cylinder shape disposed inside the camera module 500 or the electronic device 400 and extending along the second direction D2, and may transmit the light RL2 traveling along the second direction D2. In some embodiments, the dummy member 423d may be one lens having a positive or negative refractive power. In another embodiment, the dummy member 423d may be a component integrated with any one of the second lenses 423a, 423b, and 423c or the second refractive member 415.

According to various embodiments, the light shielding member 425 may be provided or disposed on at least a portion of the outer circumferential surface of the dummy member 423d, and may absorb, scatter, or reflect light. The light shielding member 425 may be provided by performing, for example, etching or black lacquer processing, and/or printing or depositing a reflective layer on at least a portion of an outer peripheral surface of the dummy member 423d. In an embodiment, a part of the light reflected or refracted by the first refractive member 413 (e.g., the light indicated by "GRL" in FIG. 8) may be absorbed, scattered, or reflected by the light shielding member 425, and the light shielding member 425 may substantially block the light that is reflected or refracted by the first refractive member 413 (the light indicated by "RL1" in FIG. 7 or "GRL" in FIG. 8) from being directly incident on the image sensor 411.

According to various embodiments, light may be incident on the camera module in a direction other than the photographing direction or the orientation direction (GIL, see FIG. 8) or may travel through a path other than a designed optical path (e.g., the paths indicated by "RL1" and/or "RL2" in FIG. 7) in the process of reflection or refraction within the camera module 500, thereby being detected by the image sensor. Light incident on the image sensor through an unintended path or an image generated by the light may be referred to as "ghost light" or "ghost image". The quality of an image acquired through the camera module 500 may be deteriorated due to the ghost image. According to an embodiment, the light shielding member 425 is configured to absorb, scatter, or reflect ghost light (e.g., the light GRL reflected or refracted by the first refractive member 413), thereby blocking the ghost light from being directly incident on the image sensor 411. For example, light sequentially passing through the first direction D1, the second direction D2, and/or the third direction D3 in the camera module 500 (e.g., the light following the paths indicated by "IL", "RL1", and "RL2" in FIG. 7) may be incident on the image sensor 411, and the light traveling another path may be substantially blocked from being incident on the image sensor 411.

According to various embodiments, the at least one optical member may include at least one second lenses 423a, 423b, or 423c moving forward and backward along the second direction D2 between the first refractive member 413 and the second refractive member 415. For example, the electronic device 400 or the camera module 500 may adjust the focal length by moving the at least one second lens 423a, 423b, or 423c forward or backward in the second direction D2. A miniaturized electronic device such as a smart phone may have a thickness of about 10 mm, and in this case, a range in which the lens can move forward and backward in the thickness direction may be limited.

According to various embodiments, the second direction D2 can be substantially parallel to the longitudinal direction (e.g., the Y-axis direction of FIG. 4), the width direction (e.g., the X-axis direction of FIG. 4), and/or the X-Y plane, and compared to a general wide-angle camera that moves forward and backward in the Z-axis direction for focus adjustment, the range in which the at least one second lens 423a, 423b, or 423c may move forward and backward may be large. For example, since at least one second lens 423a, 423b, or 423c moves forward and backward along the second direction D2, the telephoto performance may be improved in the camera module 500, and thus the degree of design in securing a space for forward and backward movement for focus adjustment can be improved.

According to various embodiments, the effective focal length of the lens assembly or camera module 500 may be about 1.8 times or more of the diagonal length of the imaging surface or active area of the image sensor 411 (hereinafter, the "size of the image sensor"). For example, when mounted in a miniaturized electronic device having a length or width of about 180 mm or less and a thickness of about 10 mm or less (e.g., the electronic device 300 or 400 in FIG. 4 or 6), the ratio of the size and the effective focal length of the image sensor 411 described above may be suitable for enlarging the image sensor 411 while implementing a telephoto function. In an embodiment, when the camera module 500 is manufactured to have an effective focal length of about 11.7 mm and the image sensor 411 is manufactured to have a size of about 5.5 mm, the performance of the image sensor 411 can be enhanced while implementing a telephoto function. Here, the "size" of the image sensor 411 may be a diagonal length of an effective pixel area (an active area). In another embodiment, in a miniaturized electronic device, considering the mounting space of an electronic component such as a battery (e.g., the battery 350 in FIG. 4) or a circuit board (e.g., the printed circuit board 340 in FIG. 4), the effective focal length of the camera module 500 may be approximately 2.5 times or less of the size of the image sensor 411.

According to various embodiments, the electronic device 400 and/or the camera module 500 may further include an infrared cut-off filter 419. In an embodiment, the infrared cut-off filter 419 may block light of an infrared or near-infrared wavelength band from being incident on the image sensor 411 and may be disposed at any position in the optical path between the first lens 421a and the image sensor 411. In some embodiments, by disposing the infrared cut-off filter 419 at a position close to the image sensor 411 (e.g., between the image sensor 411 and the second refractive member 415), it is possible to inhibit or prevent the infrared cut-filter 419 from being visually exposed to the outside. In an embodiment, the first refractive member 413, the second refractive member 415, and/or the at least one optical member (e.g., the second lens group 423) may include an infrared cut-off coating layer, and in this case, the infrared cut-off filter 419 may be omitted. In some embodiments, the infrared cut-off coating layer may be provided on at least one of the image sensor-side surface and the object-side surface of the dummy member 423d or the second refractive member 415. Accordingly, the image sensor 411 may detect light that substantially passes through the infrared cut-off filter 419 (or the infrared cut-off coating layer).

According to various embodiments, the electronic device 400 and/or the camera module 500 may not include an optical member, for example, the dummy member 423d. In this case, a light shielding member 425 may be disposed on at least a portion of the infrared cut-off filter 419. Various arrangements of the light shielding member 425 will be further described with reference to FIGS. 8 and 9.

Figure 8:
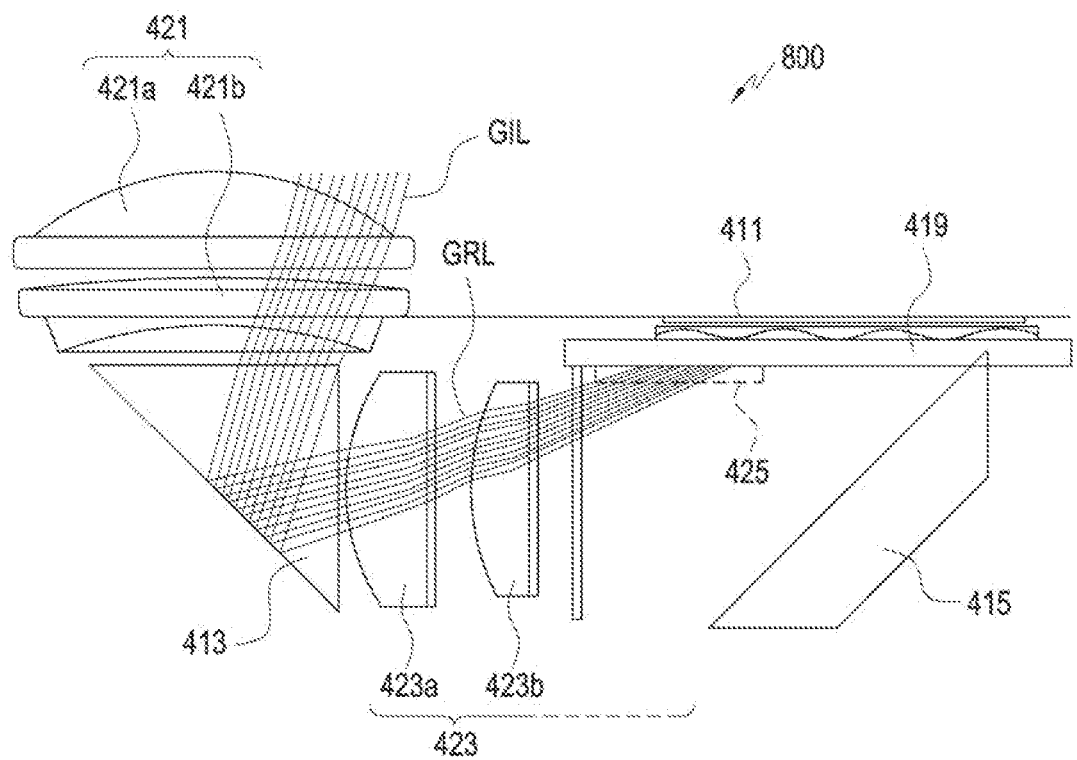
FIG. 8 is a configuration view illustrating a camera module of the electronic device according to various embodiments.
Figure 9:
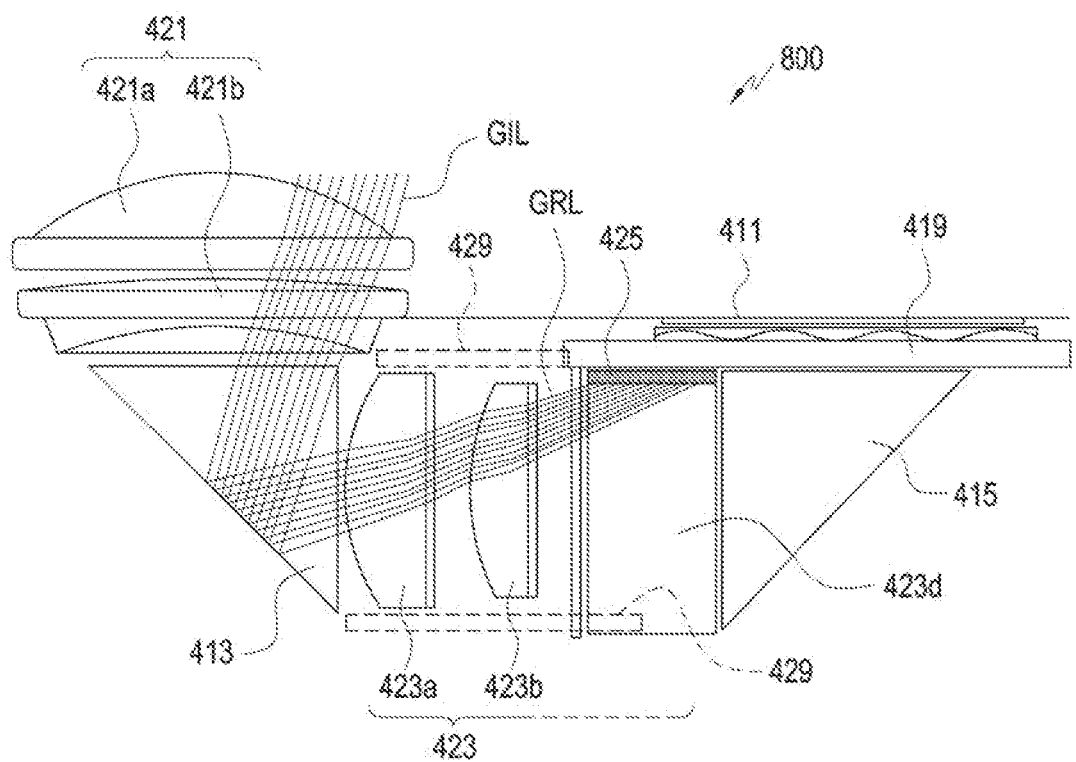
FIG. 9 is a configuration view illustrating another example of the camera module of the electronic device according to various embodiments.

FIG. 8 is a cross-sectional view illustrating a camera module (e.g., the camera module 500 in FIG. 6) of an electronic device (e.g., the electronic device 300 or 400 of FIG. 4 or FIG. 6) according to various embodiments. FIG. 9 is a configuration view illustrating another example of the camera module 500 in the electronic device 400 according to various embodiments.

Referring to FIGS. 8 and 9, the light shielding member 425 may be disposed on the infrared cut-off filter 419 or the dummy member 423d. As described above, the dummy member 423d may be disposed between the first refractive member 413 and the second refractive member 415, and the infrared cut-off filter 419 may be disposed between the second refractive member 415 and the image sensor 411. According to an embodiment, light focused or aligned by the first lens 421a (or the first lens group 421) (e.g., light indicated by "IL" in FIG. 7) may be incident on the first refractive member 413, and the light refracted or reflected by the first refractive member 413 (e.g., the light indicated by "RL1" in FIG. 7) may be generally guided to the second refractive member 415. However, a part of the incident light (e.g., the light indicated by "GIL" in FIGS. 8 and 9) may be refracted or reflected by the first refractive member 413 to travel toward the image sensor 411. In an embodiment, the light shielding member 425 may be disposed on the infrared cut-off filter 419 or the dummy member 423*d* and may substantially block the light refracted or reflected by the first refractive member 413 (e.g., the light indicated by "GIL" in FIGS. 8 and 9) from being directly incident on the image sensor. For example, the light shielding member 425 may absorb, scatter, or reflect light that is refracted or reflected by the first refractive member 413 and travels toward the image sensor 411, thereby directly blocking the light from being directly incident on the image sensor 411 and suppressing the occurrence of a ghost image.

According to various embodiments, when the camera module 500 includes a barrel structure 429 configured to dispose therein the second lens or lenses 423*a*, 423*b*, and 423*c*(s), the dummy member 423*d* may be omitted and the barrel structure 429 itself may provide the function of the light shielding member 425 or the light shielding member 425 may be disposed in the barrel structure 429. For example, the dummy member 423*d* may be omitted, and the infrared cut-off filter 419 or the barrel structure 429 may provide an environment in which the light shielding member 425 may be disposed. In another embodiment, when any one of the second lenses 423*a*, 423*b*, and 423*c* is disposed at an appropriate position and the outer circumferential surface thereof has a sufficient length in the second direction D2, the light shielding member 425 may be provided on any one of the second lens 423*a*, 423*b*, and 423*c*. In another embodiment, although a name different from the second lenses 423*a*, 423*b*, and 423*c* is given, the dummy member 423*d* may function as an additional second lens when having a positive or negative refractive power. When it is described that the dummy member 432*d* "functions as a lens", it may be that the dummy member 423*d* aligns, focuses, or guides transmitted light. In another embodiment, in a structure in which the infrared cut-off filter 419 is disposed considerably close to the image sensor 411, when the light shielding member 425 is disposed on the infrared cut-off filter 419 in the third direction (e.g., the third direction D3 in FIG. 6), the light shielding member 425 may interfere with the optical path leading to the image sensor 411. For example, in disposing the light shielding member 425 in the infrared cut-off filter 419, the shape or position of the light shielding member 425 may be determined in consideration of the optical path between the second refractive member 415 and the image sensor 411.

In the camera module 500 according to various embodiments, light incident from the outside may be reflected or refracted at least once to reach the image sensor 411. For example, since it is possible to dispose the arrangement direction of lenses or the movement direction of a lens (e.g., the second lens(es) 423*a*, 423*b*, and 423*c* in FIG. 6 or 7) for adjusting the focal length parallel to the longitudinal direction of the electronic device 400 (e.g., the Y-axis direction in FIG. 4) or the width direction of the electronic device 400 (e.g., the X-axis direction in FIGS. 4 and 6), it may be easier to provide a telephoto function when the camera module 500 is mounted in a miniaturized electronic device. In another embodiment, with the optical path having a structure in which light is reflected or refracted, it is possible to provide an environment that enables the image sensor 411 to be disposed on a plane substantially parallel to the longitudinal direction and/or the width direction of the electronic device 400, and with the structure in which the image sensor 411 is shifted, it is possible to provide an optical image stabilization structure. For example, the camera module 500 according to various embodiments disclosed herein is configured to provide a telephoto function and a handshake correction function when mounted on a miniaturized electronic device (e.g., the electronic devices 300 and 400 of FIG. 4 or 6). In another embodiment, when the image sensor 411 is disposed in a plane substantially parallel to the longitudinal direction and/or the width direction of the electronic device 400, it may be easier to increase the size of the image sensor 411 when compared to a structure in which the image sensor is disposed in a plane parallel to the thickness direction of the electronic device. For example, since the image sensor 411 is disposed in a plane parallel to the longitudinal direction and/or the width direction of the electronic device, it may be easier to mount the high-performance camera module 500 in a miniaturized electronic device.

As described above, according to various embodiments, a lens assembly and/or a camera module (e.g., the camera module 500 in FIGS. 6 to 9) may include a first refractive member (e.g., the first refractive member 413 of FIGS. 6 to 9) configured to reflect or refract light (e.g., the light indicated by "IL" in FIG. 6) that is incident in a first direction (e.g., the first direction D1 in FIG. 6), in a second direction (e.g., the second direction D2 in FIG. 6) intersecting the first direction, a second refractive member (e.g., the second refractive member 415 in FIGS. 6 to 9) configured to reflect or refract the light (e.g., the light indicated by "RL1" in FIG. 6) that is reflected or refracted by the first refractive member and is incident along the second direction, in a third direction (e.g., the third direction D3 in FIG. 6) intersecting the second direction, an image sensor (e.g., the image sensor 411 in FIGS. 6 to 9) configured to detect the light that is reflected or refracted by the second refractive member and is incident along the third direction (e.g., the light indicated by "RL2" in FIG. 6), and at least one optical member (e.g., the second lens or lenses 433*a*, 423*b*, and 423*c* or dummy member 423*d* in FIGS. 6 to 9) disposed in an area or space between the first refractive member and the second refractive member. The at least one optical member may be configured to block the light that is reflected or refracted by the first refractive member from being incident on the image sensor, and to guide light incident on the second refractive member along the second direction.

According to various embodiments, the at least one optical member may include a dummy member (e.g., the dummy member 423*d* in FIG. 6 or FIG. 9) extending along the second direction and transmitting light traveling in the second direction, and a light shielding member (e.g., the light shielding member 425 in FIG. 6, FIG. 8, and/or FIG. 9) provided on at least a portion of an outer circumferential surface of the dummy member, and the light shielding member may be configured to absorb, scatter or reflect the light (e.g., the light indicated by "GRL" in FIG. 8 or FIG. 9) that is reflected or refracted by the first refractive member to block the light from being incident on the image sensor.

According to various embodiments, the above-described camera module may further include a lens group (e.g., the first lens 421*a* or the first lens group 421 in FIGS. 6 to 9) having a positive refractive power, and the lens group may be configured to guide or focus, to the first refractive member, the light that is incident in the first direction.

According to various embodiments, at least one optical member may include at least one lens (e.g., at least one of the second lenses 423*a*, 423*b*, and 423*c* in FIGS. 6 to 9) configured to move forward and backward between the first refractive member and the second refractive member along the second direction.

According to various embodiments, at least one optical member may include a light shielding member provided on at least a portion of an outer circumferential surface of the at least one lens, and the light shielding member may be configured to absorb, scatter, or reflect the light that is reflected or refracted by the first refractive member to block the light from being incident on the image sensor.

According to various embodiments, the above-described camera module may include an infrared cut-off filter (e.g., the infrared cut-off filter 419 in FIGS. 6 to 9) disposed between the second refractive member and the image sensor, and the image sensor may be configured to detect light that passes through the infrared cut-off filter.

According to various embodiments, at least one of the first refractive member, the second refractive member, or the at least one optical member may include an infrared cut-off coating layer, and the image sensor may be configured to detect light that passes through the infrared cut-off coating layer.

According to various embodiments, the first refractive member may be configured to reflect or refract light in a direction perpendicular to the first direction, and the second refractive member is configured to reflect or refract light in a direction perpendicular to the second direction.

According to various embodiments, the image sensor may be configured to horizontally move in a plane perpendicular to the first direction or a plane perpendicular to the third direction (e.g., the X-Y plane in the coordinate system of FIG. 4 or a plane parallel to the same).

According to various embodiments, in the above-described camera module, the effective focal length may be set to be 1.8 times or more and 2.5 times or less of the diagonal length of the imaging plane of the image sensor.

According to various embodiments disclosed herein, a camera module (e.g., the camera module in FIGS. 6 to 9) may include a first refractive member (e.g., the first refractive member 413 of FIGS. 6 to 9) configured to reflect or refract light (e.g., the light indicated by "IL" in FIG. 6) that is incident in a first direction (e.g., the first direction D1 in FIG. 6), in a second direction (e.g., the second direction D2 in FIG. 6) intersecting the first direction, a second refractive member (e.g., the second refractive member 415 in FIGS. 6 to 9) configured to reflect or refract the light (e.g., the light indicated by "RL1" in FIG. 6) that is reflected or refracted by the first refractive member and is incident along the second direction, in a third direction (e.g., the third direction D3 in FIG. 6) intersecting the second direction, an image sensor (e.g., the image sensor 411 in FIGS. 6 to 9) configured to detect the light that is reflected or refracted by the second refractive member and is incident along the third direction (e.g., the light indicated by "RL2" in FIG. 6), and a light shielding member (e.g., the light shielding member 425 in FIG. 6, FIG. 8, and/or FIG. 9) disposed in an area or a space between the first refractive member and the second refractive member. The light shielding member may be configured to at least partially absorb, scatter, or reflect the light that is reflected or refracted by the first refractive member and travels toward the image sensor.

According to various embodiments, the above-described camera module may further include a lens group (e.g., the first lens 421a or the first lens group 421 in FIGS. 6 to 9) having a positive refractive power, and the lens group may be configured to guide or focus, to the first refractive member, the light that is incident in the first direction.

According to various embodiments, the above-described camera module may further include at least one lens (e.g., at least one of the second lenses 423a, 423b, and 423c in FIGS. 6 to 9) configured to move forward and backward between the first refractive member and the second refractive member along the second direction, and at least one lens may be configured to guide or focus, to the second refractive member, the light that is reflected or refracted by the first refractive member.

According to various embodiments, the image sensor may be configured to horizontally move in a plane perpendicular to the first direction or a plane perpendicular to the third direction (e.g., the X-Y plane in the coordinate system of FIG. 4 or a plane parallel to the same).

According to various embodiments, the above-described camera module may include an infrared cut-off filter (e.g., the infrared cut-off filter 419 in FIGS. 6 to 9) disposed between the second refractive member and the image sensor, and the light shielding member is disposed on at least a portion of the infrared cut-off filter, and the image sensor may be configured to detect light that passes through the infrared cut-off filter.

According to various embodiments, the above-described camera module may include a dummy member (e.g., the dummy member 423d in FIG. 6 or FIG. 9) disposed between the first refractive member and the second refractive member and configured to guide or focus, to the second refractive member, the light that is reflected or refracted by the first refractive member, and the light shielding member may be provided on at least a portion of an outer circumferential surface of the dummy member.

According to various embodiments, the first refractive member may be configured to reflect or refract light in a direction perpendicular to the first direction, and the second refractive member is configured to reflect or refract light in a direction perpendicular to the second direction.

According to various embodiments, the above-described camera module may include a lens group having a positive refractive power and configured to guide or focus, to the first refractive member, the light incident in the first direction, and at least one lens disposed between the first refractive member and the second refractive member and configured to move forward and backward along the second direction. The at least one lens may be configured to guide or focus, to the second refractive member, the light that is reflected or refracted by the first refractive member.

According to various embodiments, the above-described camera module may include a dummy member disposed between the first refractive member and the second refractive member and configured to guide or focus, to the second refractive member, the light that is reflected or refracted by the first refractive member, and the light shielding member may be provided on at least a portion of an outer circumferential surface of the dummy member.

According to various embodiments, in the above-described camera module, the effective focal length may be set to be 1.8 times or more and 2.5 times or less of the diagonal length of the imaging plane of the image sensor.

According to various embodiments, since the lens assembly and/or the camera module include the folded optics, the telephoto function may be easily implemented in a miniaturized electronic device. For example, since the arrangement direction of the lenses or the forward/backward movement of the lenses for focus adjustment can be implemented substantially parallel to the longitudinal direction or the width direction of the electronic device, a telephoto function can be easily implemented without substantially affecting the thickness of the electronic device. In another embodiment, in the lens assembly and/or camera module, incident light can be refracted at least once (e.g., twice) to reach the image sensor, and the optical image stabilization function can be implemented in the manner of shifting the image sensor in the longitudinal or width direction of the electronic device. For example, it may be easy to secure an installation space of the image sensor and a shift interval for the optical image stabilization function. In another embodiment, as it becomes easier to secure the installation space, it is easier to increase the size and to improve performance of the image sensor, and the performance of the camera can be improved in terms of image quality. In addition, various effects directly or indirectly understood through this document can be provided.

In the foregoing detailed description, embodiments have been described. However, it will be evident to a person ordinarily skilled in the art that various modifications can be made without departing from the scope of the disclosure.

What is claimed is:

1. A camera module comprising:
a first refractive member configured to reflect or refract light that is incident on the first refractive member in a first direction, in a second direction intersecting the first direction;
a second refractive member configured to reflect or refract the light that is reflected or refracted by the first refractive member and is incident on the second refractive member in the second direction, in a third direction intersecting the second direction;
an image sensor configured to detect the light that is reflected or refracted by the second refractive member and is incident on the image sensor in the third direction; and
at least one optical member provided between the first refractive member and the second refractive member,
wherein the at least one optical member comprises a dummy member extending in the second direction and configured to transmit light traveling in the second direction, and a first light shielding member provided on at least a portion of an outer circumferential surface of the dummy member,
wherein the dummy member is configured to guide the light that is reflected or refracted by the first refractive member to be incident on the second refractive member in the second direction,
wherein the first light shielding member and the outer circumferential surface of the dummy member face the third direction, and
wherein the first light shielding member is configured to absorb, scatter or reflect the light that is reflected or refracted by the first refractive member to block a portion of the light from being directly incident on the image sensor.

2. The camera module of claim 1, further comprising a lens group having a positive refractive power,
wherein the lens group is configured to guide or focus, to the first refractive member, the light that is incident in the first direction.

3. The camera module of claim 1, wherein the at least one optical member further comprises at least one lens configured to move forward and backward between the first refractive member and the dummy member along the second direction.

4. The camera module of claim 3, wherein the at least one optical member further comprises a second light shielding member provided on at least a portion of an outer circumferential surface of the at least one lens, and
wherein the second light shielding member is configured to absorb, scatter, or reflect the light that is reflected or refracted by the first refractive member to block the light from being directly incident on the image sensor.

5. The camera module of claim 1, further comprising an infrared cut-off filter provided between the second refractive member and the image sensor,
wherein the image sensor is configured to detect light that passes through the infrared cut-off filter.

6. The camera module of claim 1, wherein at least one of the first refractive member, the second refractive member, or the at least one optical member comprises an infrared cut-off coating layer, and
wherein the image sensor is configured to detect light that passes through the infrared cut-off coating layer.

7. The camera module of claim 1, wherein the second direction is perpendicular to the first direction, and the third direction is perpendicular to the second direction.

8. The camera module of claim 1, wherein the image sensor is configured to horizontally move in a plane perpendicular to the first direction or a plane perpendicular to the third direction.

9. The camera module of claim 1, wherein an effective focal length is 1.8 times or more and 2.5 times or less of a diagonal length of an imaging plane of the image sensor.

10. The camera module of claim 1, wherein the first light shielding member is configured to at least partially absorb, scatter, or reflect the light that is reflected or refracted by the first refractive member and travels toward the image sensor other than the second direction.

11. The camera module of claim 10, further comprising at least one lens configured to move forward and backward along the second direction between the first refractive member and the dummy member,
wherein the at least one lens and the dummy member is configured to guide or focus, to the second refractive member, the light that is reflected or refracted by the first refractive member.

12. The camera module of claim 10, further comprising:
an infrared cut-off filter provided between the second refractive member and the image sensor, and
a third light shielding member is provided on at least a portion of an outer circumferential surface of the infrared cut-off filter,
wherein the image sensor is configured to detect light that passes through the infrared cut-off filter.

13. The camera module of claim 10, further comprising:
a lens group having a positive refractive power and configured to guide or focus, to the first refractive member, the light incident on the first refractive member in the first direction; and
at least one lens provided between the first refractive member and the dummy member, the at least one lens being configured to move forward and backward along the second direction,
wherein the at least one lens and the dummy member are configured to guide or focus, to the second refractive member, the light that is reflected or refracted by the first refractive member.

14. An electronic device comprising:
a housing; and
a camera module provided on the housing, the camera module comprising:
a first refractive member configured to reflect or refract light that is incident on the first refractive member in a first direction, in a second direction intersecting the first direction;
a second refractive member configured to reflect or refract the light that is reflected or refracted by the first refractive member and is incident on the second refractive member in the second direction, in a third direction intersecting the second direction;

an image sensor configured to detect the light that is reflected or refracted by the second refractive member and is incident on the image sensor in the third direction; and at least one optical member provided between the first refractive member and the second refractive member, wherein the at least one optical member comprises a dummy member extending in the second direction and configured to transmit light traveling in the second direction, and a first light shielding member provided on at least a portion of an outer circumferential surface of the dummy member, wherein the dummy member is configured to guide the light that is reflected or refracted by the first refractive member to be incident on the second refractive member in the second direction, wherein the first light shielding member and the outer circumferential surface of the dummy member face the third direction, and wherein the first light shielding member is configured to absorb, scatter or reflect the light that is reflected or refracted by the first refractive member to block a portion of the light from being directly incident on the image sensor.

15. The electronic device of claim 14, further comprising a lens group having a positive refractive power, wherein the lens group is configured to guide or focus, to the first refractive member, the light that is incident in the first direction.

16. The electronic device of claim 14, wherein the at least one optical member comprises at least one lens configured to move forward and backward between the first refractive member and the second refractive member along the second direction.

* * * * *